United States Patent [19]
Gilbert

[11] Patent Number: 6,067,583
[45] Date of Patent: May 23, 2000

[54] MODULAR, RECONFIGURABLE COMPONENTS METHODS FOR WIRELESS DATA TRANSFER BETWEEN A COMPUTER AND A COMMUNICATIONS SYSTEM

[75] Inventor: Timothy G. Gilbert, Vermillion, S. Dak.

[73] Assignee: Gateway 2000, Inc., North Sioux City, S. Dak.

[21] Appl. No.: 09/059,766

[22] Filed: Apr. 14, 1998

[51] Int. Cl.[7] .............................. G06F 13/00; G06F 13/10
[52] U.S. Cl. .................................. 710/8; 710/14; 710/20; 455/1; 455/42; 455/557
[58] Field of Search ................................ 710/14, 8, 20; 455/1, 42, 557

[56] References Cited

U.S. PATENT DOCUMENTS

| | | | |
|---|---|---|---|
| 4,887,311 | 12/1989 | Garner et al. | 455/76 |
| 5,043,721 | 8/1991 | May | 340/825.44 |
| 5,163,161 | 11/1992 | Bowles et al. | 455/164.1 |
| 5,301,360 | 4/1994 | Goldberg | 455/67.4 |
| 5,444,869 | 8/1995 | Stricklin et al. | 455/89 |
| 5,574,979 | 11/1996 | West | 455/63 |
| 5,594,953 | 1/1997 | Ross et al. | 455/89 |
| 5,887,026 | 3/1999 | Arai | 375/222 |
| 5,913,034 | 6/1999 | Malcolm | 709/223 |

FOREIGN PATENT DOCUMENTS

| | | | |
|---|---|---|---|
| 6-90310 | 3/1994 | Japan. | |
| 95/14357 | 5/1995 | WIPO | H04Q 7/22 |

*Primary Examiner*—Thomas C. Lee
*Assistant Examiner*—Thuan Du
*Attorney, Agent, or Firm*—Schwegan, Lunderberg, Woessner & Kluth, P.A.

[57] ABSTRACT

A wired modem normally plugs directly into a computer and connects to a telephone system by wired connection to a wall jack. This same modem can be used in a wireless configuration by plugging it into a single-module base station unit located near the wall jack and containing a baseband-to-wireless transceiver. A single module remote station plugs into the computer in place of the modem, and contains another baseband-to-wireless transceiver for communicating wireless data with the base station. The base and remote stations duplicate very little of the functionality performed by the modem, making the modem easily replaceable in either wired or wireless configurations.

19 Claims, 7 Drawing Sheets

MODULAR, RECONFIGURABLE COMPONENTS METHODS FOR WIRELESS DATA TRANSFER BETWEEN A COMPUTER AND A COMMUNICATIONS SYSTEM

BACKGROUND OF THE INVENTION

The present invention relates to electronic communications, and more specifically concerns transferring data by either wired or wireless means between a computer and a telephone system or similar communications facility.

Many desktop and portable computers interface with the public switched telephone system or similar communications network via a data converter such as a modem. Typically, the connections to such systems or networks are physically implemented as a plug located at a fixed position on a wall. A physical wire or cable then connects this jack to a connector on the modem, and the modem is plugged into a slot in the computer. Other types of fixed-position connectors include floor-mounted receptacles, short cable stubs running through heating and ventilating ducts, and connector blocks tapping into loose cables running through ceiling panels, along baseboards, and through office cubicles.

Most office-based or home-based desktop personal computers attach to a communications network by a wired connection to a modem implemented as a small card or package mounted inside or alongside the computer. This type of attachment is inexpensive and adequate as long as the computer remains in a relatively fixed position convenient to a fixed-position network plug.

However, sometimes a wired connection between a computer and a communications network is inconvenient or not feasible, even when the computer remains only a short distance from the fixed plug. For example, a person may wish to handle e-mail from a laptop personal computer at a table across the room from the nearest telephone plug. A wire snaked across the floor is a tether against mobility, as well as an invitation to damage to the computer. Many other situations would also welcome a way to allow short-range mobility of a computer or other data processor while remaining connected to a telephone or other form of network.

Wireless modems and other interfaces are known in the art. Infrared links between laptops and printers are becoming common. Radio-frequency systems are beginning to assert themselves. However, wireless links of all kinds suffer from several disadvantages. First, they tend to be more expensive than their hard-wired equivalents. If everyone in a building or office complex required relatively wide-range mobility, conventional wireless systems might prove economical. But frequently only a small number of people in an office need mobility, and then only over short distances. Neighborhood and building wireless systems for residential and hotel use are not yet widely available, and they promise to require expensive equipment.

In any event, many users desire both wired and wireless capability. Even if wireless components become plentiful and cheap, users must purchase both wired and wireless equipment offering essentially the same functionality. This duplication of functionality greatly increases the cost of communication. Moreover, modems tend to become obsolete quickly, as speeds and features improve. Keeping up then requires additional purchases of both types of gear, even though the wireless-interface transceivers in a link tends to change less rapidly. For example, the infrared portions of a TV remote control and the radio-frequency chips of a cellular telephone operate at essentially the same parameter values that they did ten years ago; they have merely become less expensive. Moreover, the conventional conversion of modulated digital data directly to radio-frequency format raises technical problems; it is not presently clear, for example, that modem protocols operating at 56 Kbps or higher speeds will perform satisfactorily with wireless transceivers.

Accordingly, many "wired" computer users would welcome an individual, short-range, inexpensive, easily upgradable wireless interface to a communications system.

SUMMARY OF THE INVENTION

The present invention provides a system and a set of components that allow the same modem or similar communications adapter to be operated in both wireless and wired configurations at little additional cost over that of a wireless system alone. In a wired configuration, the modem connects directly to a computer, and employs a physical wire to the communications network. For wireless operation, a physically small modular base station connects to the modem and provides power for it. Although the modem still connects to the network by a wire, the modem/base-station combination can be located near the fixed-position network plug, in a safe and inconspicuous place. A remote station, packaged as another small module, plugs into the computer in place of the modem, and transfers wireless data to and from the base station module. Therefore, both the wired and the wireless configurations can be upgraded to the most recent pinnacle of performance merely by replacing a single small modem. Avoiding duplication of the modem functions renders the cost of a combined wired/wireless system little more than that of a wireless system alone. Although many users of the invention will employ it relatively far from other users, the use of limited-range wireless converters not only lowers costs, but also reduces the likelihood of interference among users of the same system.

Other advantages and features of the invention, as well as variations within the spirit and scope of the appended claims, will become apparent to those skilled in the art from the following detailed description. This description mentions a few of the possible variations, and includes some broad meanings attached to the terms employed herein.

BRIEF DESCRIPTION OF THE DRAWINGS

FIG. 2 comprising

FIG. 3 comprising

FIG. 4 comprising

DETAILED DESCRIPTION OF THE PREFERRED EMBODIMENTS

Figure 1:
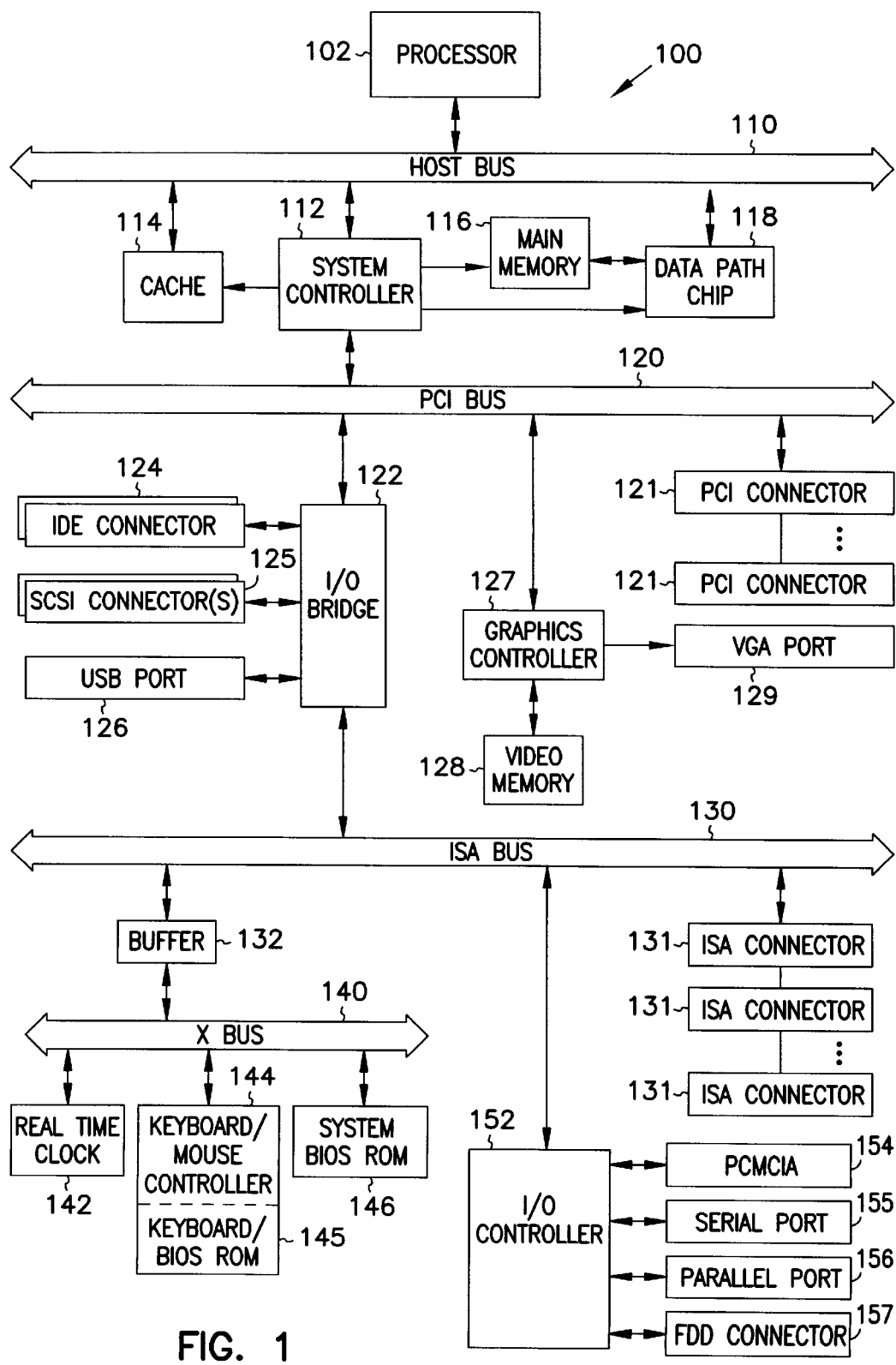
FIG. 1 is a block diagram of a computer system environment for the present invention.

FIG. 1 shows a block diagram of a computer system 100 serving as an environment for the present invention. In this embodiment, processor 102, system controller 112, cache 114, and data-path chip 118 are each coupled to host bus 110. Processor 102 is a microprocessor such as a Pentium®, Pentium II® or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 114 (i.e., in the near future). Main memory 116 is coupled between system controller 112 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 66 MHZ. In another embodiment, PCI bus 120 provides a 64-bit-wide data path that runs at 66 MHZ. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124, SCSI connectors 125, a USB (Universal Serial Bus) port 126, and ISA (Industry Standard Architecture) bus 130. In this embodiment, an IDE connector 124 provides connectivity for up to two standard IDE-type devices such as hard disk drives, CDROM (Compact Disc-Read-Only Memory) drives, DVD (Digital Video Disk) drives, or TBU (Tape-Backup Unit) devices. In one similar embodiment, two IDE connectors 124 are provided, and each provides the EIDE (Enhanced IDE) architecture. In the embodiment shown, SCSI (Small Computer System Interface) connectors 125 provide connectivity for up to seven or fifteen SCSI-type devices, depending upon the version of SCSI supported by the embodiment. In one embodiment, I/O bridge 122 provides ISA bus 130 having one or more ISA connectors 131; in one embodiment, three connectors are provided. In one embodiment, ISA bus 130 is coupled to I/O controller 152, which in turn provides connections to one or more PCMCIA (Personal Computer Memory Card Industry Association) adapter slots 154, serial ports 155, parallel ports 156, and FDD (Floppy-Disk Drive) connectors 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

While FIG. 1 shows one typical environment for the present invention, other bus structures, memory arrangements, and so forth are specifically contemplated. For example, computer 100 could be replaced by a communications terminal, a personal digital assistant, a programmable multimedia presentation system, or a smart electrical appliance. That is, the term "computer" has a broad sweep in the context of the present invention; it may include almost anything that transfers digital data to and/or from some sort of communications system.

FIG. 2 illustrates representative components employed in the invention.

Figure 2A:
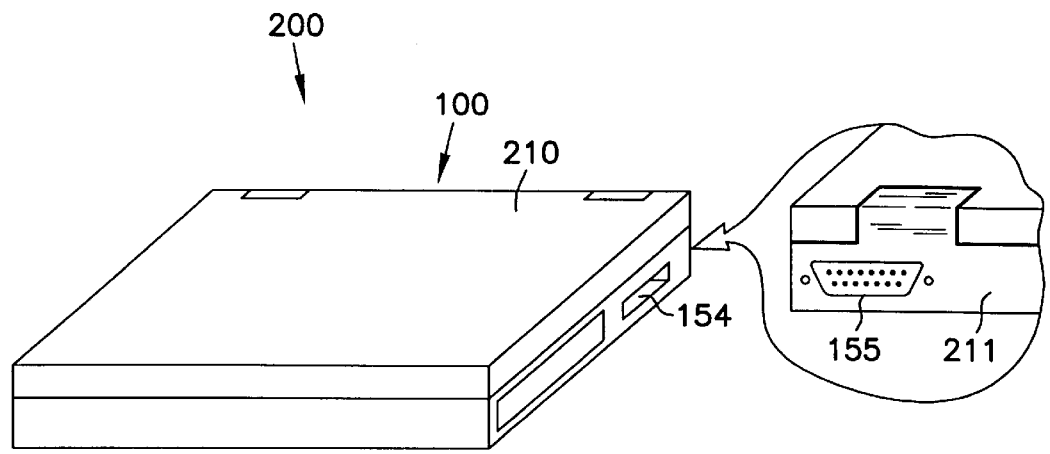
FIGS. 2A through 2E, illustrates components of the invention.

FIG. 2A exemplifies computer 100, FIG. 1, as a conventional laptop personal computer 210. One or more conventional PCMCIA connectors 154 provide slots for connecting standard peripheral cards having a conventional PCMCIA or "credit card" form factor. Computer 210 can also include a standard D-shell (DB15 or DB25) connector 155 directly on a rear skirt 211 , or indirectly via a port replicator (not shown). Although laptops do not normally provide ISA card slots such as 131, FIG. 1, a port replicator might provide one or more of them.

Figure 2B:
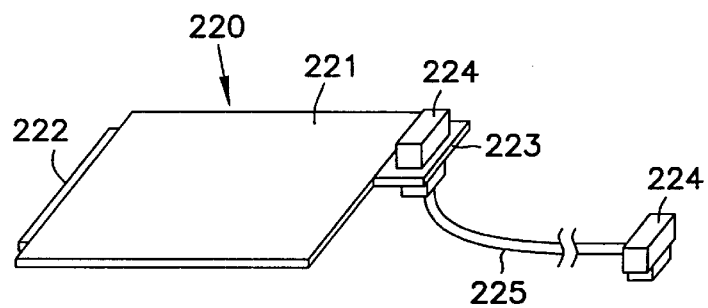

FIG. 2B shows a modem 220 packaged as a single physical module or enclosure 221 in the standard PCMCIA form factor, about the size and shape of a credit card. Male PCMCIA connector 222 mates with one of the female PCMCIA connectors 154 in computer 210 to provide signal, control, and power connections to modem 220. A standard RJ11 telephone-line plug 223 couples to an RJ11 jack connector on a separate telephone cord 225 having a similar jack 226 on its other end for connection to a telephone-system wall outlet, not shown. Modem 220 is sometimes called a "wired modem" herein, because it is designed to operate with a physical wire connection to a communications system. However, any modem or similar device that requires a physical coupling to an essentially fixed-position system connection, such as an optical fiber, has the same essential characteristics as far as the present invention is concerned. Connectors 223 sometimes slide in and out from package 221, or sometimes merely pierce through the body of the package. Other connector types can add to and/or substitute for RJ11 connector 223, such as a standard X-jack that provides more function than the RJ11 type, or a D-shell connector.

In other embodiments, not shown, modem 220 may be packaged as a standard ISA card having an ISA connector for plugging into one of the connectors 131. Other small-format packages, having either a standard or a nonstandard form factor, are also contemplated.

Figure 2C:
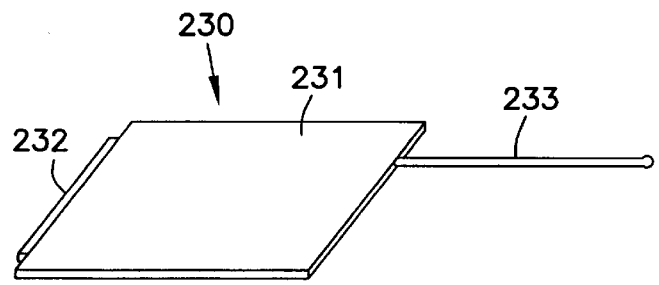

FIG. 2C shows a wireless remote station 230, packaged in a single small PCMCIA physical module or enclosure 231. Connector 232 mates with one of the PCMCIA connectors 154 in computer 100. Antenna 233 radiates and receives radiofrequency (RF) energy representing digital data from and to the computer; antenna 233 can alternatively be incorporated into the card package, e.g., along one side. Several RF bands and modes are available for license-free, non-interfering transmission of digital data at low power levels; for example, 800 MHz and 900 MHz spread-spectrum RF signals are in wide use for this purpose. Because of the short distances normally involved in the present invention, amplitude-modulated infrared (IR) beams also serve well. In this case, a conventional, very inexpensive infrared emitter and photodetector substitute for RF antenna 233. The invention contemplates the use of any other shortrange, low-power wireless technologies as well.

Figure 2D:
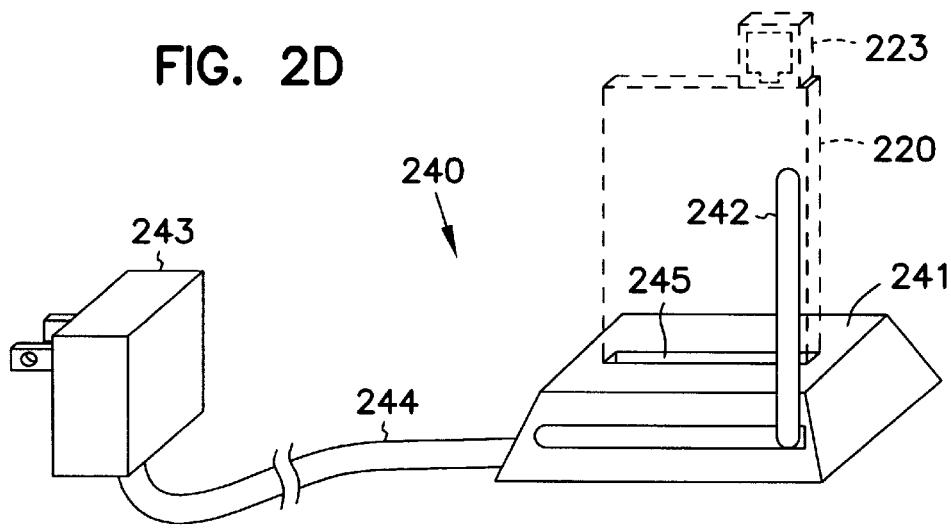

FIG. 2D shows a base station 240 packaged in a single physical module or enclosure 241. This module has an enclosure 241 adapted to sit in a small area of a desktop, shelf, or similar space; its internal circuits occupy no more volume than those of cards 220 or 230. Antenna 242 radiates and receives RF energy representing digital data from and to the base station. The wireless communications data format and signal type matches those of remote station 230. Therefore, any of the modalities employed there are useful here. For example, an IR emitter/detector may replace RE antenna 242. A conventional wall-wart power supply plugs into an AC power line to provide low-voltage direct-current power to the base station via cord 244. PCMCIA slot 245 accepts modem card 220, shown in dotted lines. Its telephone jack 223 connects to a telephone-system wall outlet as described above.

Figure 2E:
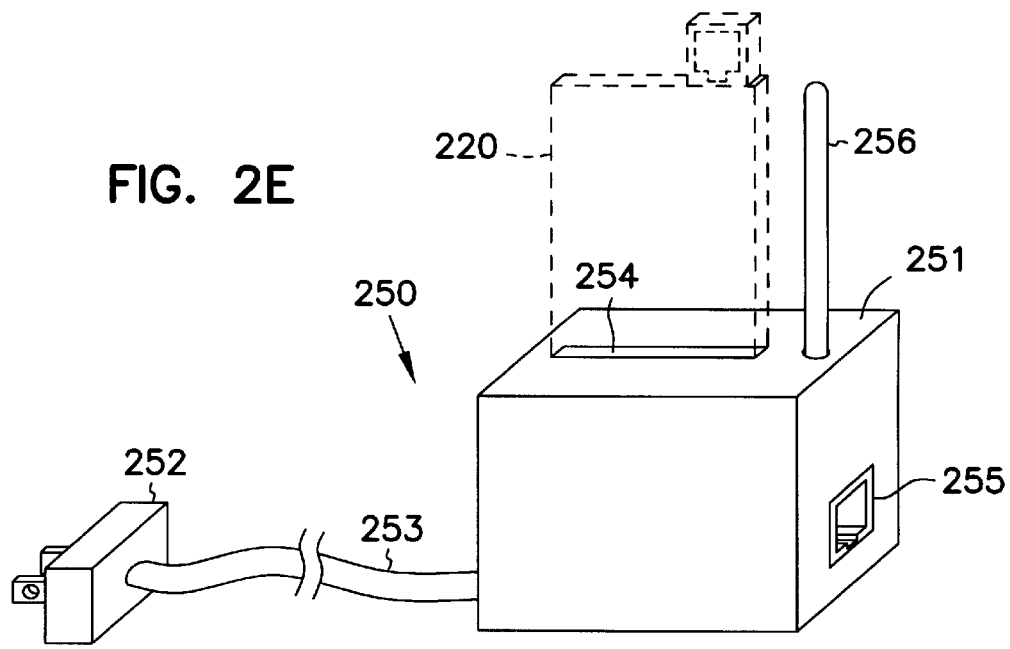

FIG. 2E shows an alternative form 250 of the base station. Here, the enclosure 251 also incorporates a power transformer, and connects directly to an AC outlet via plug 252 and cord 253. Modem 220 plugs into PCMCIA slot 254. In this embodiment, modem 220 sends and receives telephone signals via its PCMCIA connector from a telephone jack 255 physically mounted in enclosure 251. Jack 255 then connects to the telephone system. Antenna 256 exchanges RF, optical, or other wireless signals in the same manner as antenna 242, FIG. 2C.

FIG. 3 is a block-diagram rendering of the interconnection of the components shown in FIG. 2.

Figure 3A:
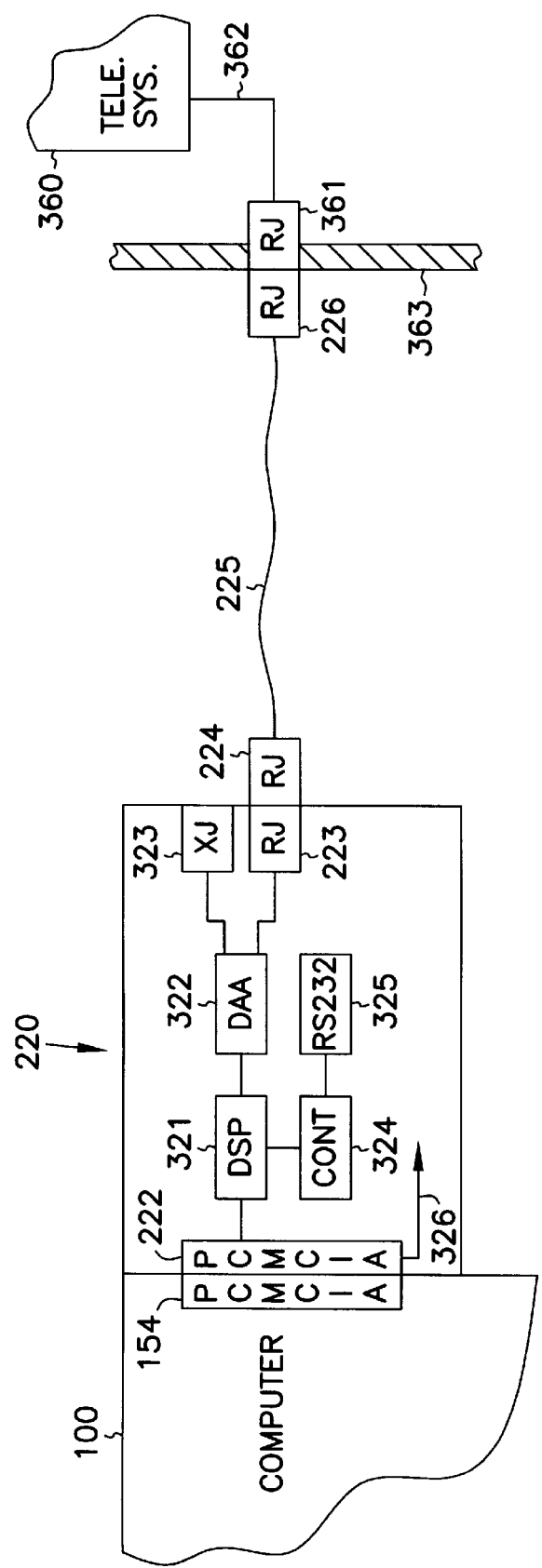
FIGS. 3A and 3B, is a block diagram showing interconnections of the components of FIG. 2 according to the invention.

FIG. 3A illustrates a wired configuration wherein computer 210 attaches directly to modem 220, which in turn transfers data by a wire to telephone system 360. Computer interface connector 154 delivers data to mating interface connector 222 of modem 220. This data normally takes the form of a bitstream in RS-232 format or some other conventional format. This form is termed "baseband" herein, because the data has a more or less raw form; however, this term is intended to include any data format in which a computer delivers data to a modem for further transmission to an external network.

Block 321 converts the baseband data from connector 222 to modulated form according to any of the numerous protocols from manufacturers and from the international standards organization CCITT, such as V.42, V42bis, V.fast, etc. Although this modulated data is called "CCITT data" herein, that term is to be understood as encompassing all forms of data adapted to be transmitted on system 360; for example, an Integrated Services Digital Network (ISDN) system employs a high-speed unmodulated bitstream divided into multiple channels. Some implementations of conventional block 321 employ hard-wired circuits, the most common present-day converter is a single-chip programmed digital signal processor. Block 322 realizes a conventional data access arrangement (DAA) for modifying the electrical parameters the CCITT data to those of system 360, and for protecting system 360 against harm from any malfunction of modem 220. DAA 322 transfers data to and from a standard connector such as RJ11 plug 223. As mentioned earlier, other forms of connector are also available, and may be preferred in some embodiments. In fact, some modems may include multiple plugs, such as the X-jack connector shown at 323.

Controller block 323 implements conventional flow-control and housekeeping functions; it can be hardwired or programmable. Block 324 optionally converts baseband data to and from a standard RS-232 format. Finally, FIG. 3A indicates that power for the circuits within modem 220 normally comes from computer 100 via a line 326 in PCMCIA connector 222.

In the configuration of FIG. 3A, a wired connection 225 includes connector 224 coupled to modem connector 223 for transferring CCITT data to jack 226. Connector 226 plugs into a RJ11 connector 361 coupled by wire 362 to telephone system 360. Plug 361 has a fixed position, such as a standard receptacle in a wall of a building, indicated schematically as 363; however, this term includes any plug that is less movable or relocatable than is computer 100. Likewise, although system 360 is characterized in this embodiment as a telephone system, the present invention does not inherently limit this term to a conventional wired public switched network. The invention also finds utility with private wired systems, telephone systems that include wireless links, local-area networks (LANs), and other forms of data-communications networks.

Figure 3B:
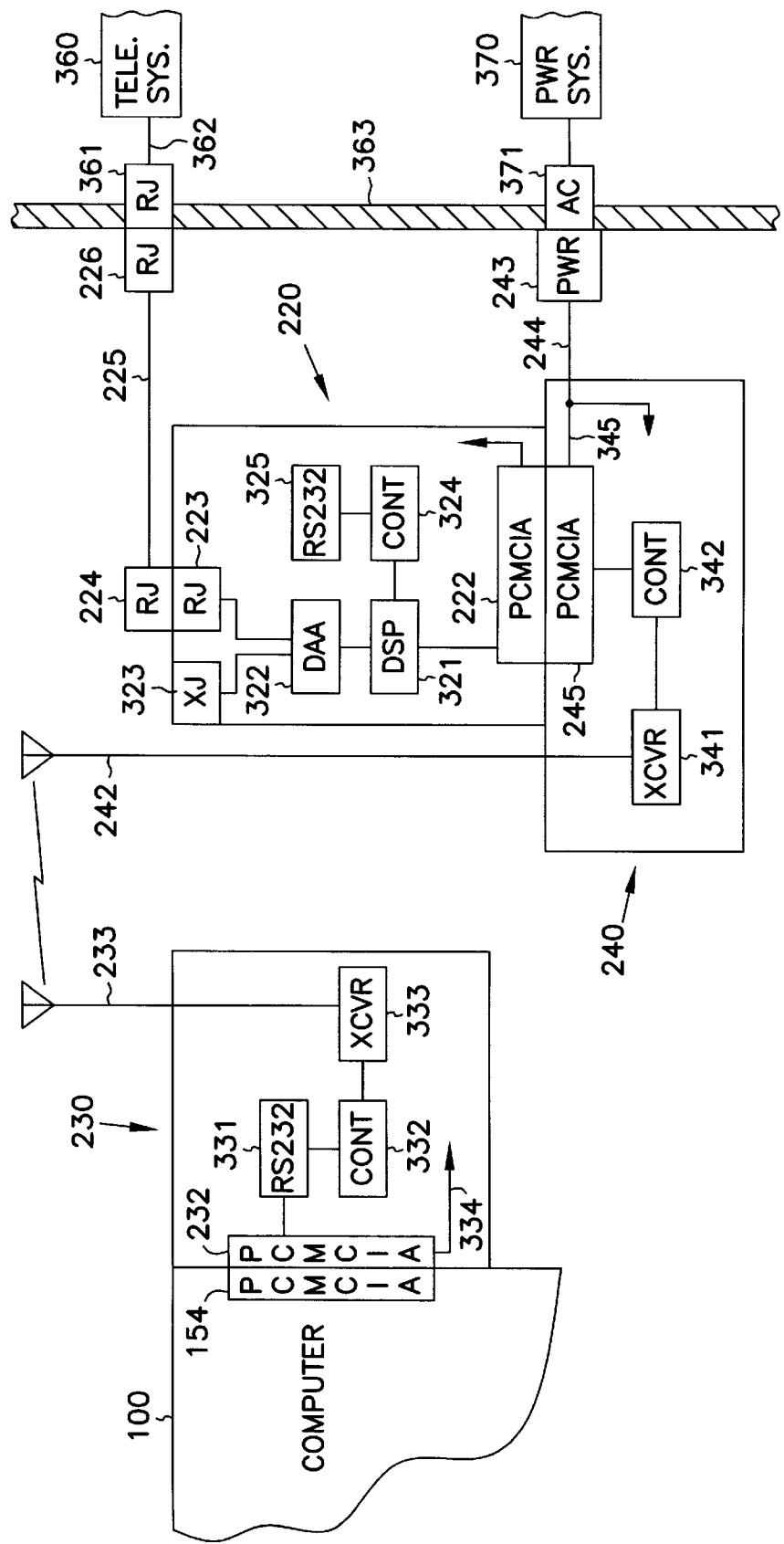

FIG. 3B illustrates the use of wireless base and remote stations. In this configuration, remote station 230 replaces modem 220 at interface connector 154 of computer 100. Mating PCMCIA interface connector 232 delivers baseband data to block 331 for any necessary modification of the bitstream to and from RS-232 format. This block also handles control signals defined in the RS-232 protocol, such as CC (data set ready) and CE (ring detect). Controller 332 provides flow control and housekeeping for remote station 230 in response to signals from block 331, and passes baseband data to and from block 333. Transceiver 333 converts baseband digital data in any convenient format to and from a wireless format, and includes transmitter and receiver circuits for amplifying wireless signals for antenna 233. Such transceivers are common and inexpensive, being employed in cellular telephones, TV remote controls, and other consumer products. As mentioned above in connection with FIG. 2B, RF, IR, and other wireless formats are easily accommodated. Line 334 supplies power from computer 100, via mating interface connectors 154 and 232.

Base station 240 transmits and receives wireless data to and from modem 230 at antenna 242. Transceiver 341 converts this data between the wireless format and a baseband format, and preferably employs a chip like that of transceiver 333. The only actual requirement, however, is compatibility of wireless-data formats. Controller 342 provides flow control and housekeeping functions similar to those of controllers 332 and 324; like them, it may comprise a simple, inexpensive chip. RS-232 connector, implemented as a part of socket 245 in FIG. 2D, transfers baseband data bidirectionally between the controller and connector stripes 227 in modem 220.

Modem 220 is the same modem that coupled directly to computer 100 in FIG. 3A. Because transceivers 333 and 341 normally have more than enough bandwidth to handle any present or future data speeds of modem 220, the data speed of the entire system can thus be upgraded for both wired and wireless configurations merely by substituting a newer, higher-speed modem 220 into either configuration. In FIG. 3B, baseband data enters and leaves through RS-232 port 227, instead of through PCMCIA interface 222; however, connector 222 could plug into a mating connector (not shown) on the base station if desired. Likewise, modem power enters connector 228 from the base station. Base-station power connector 344 is another part of socket 245, FIG. 2D, and connects to base-station power connector 246 via line 345, which also supplies power to components 341 and 342. Connector 246 receives connector 248, which supplies low-voltage direct current from transformer 247. This unit plugs receives 115 VAC power from power system 370 via wall plug 371.

In this configuration, modem telephone-line connector 223 connects to mating RJ11 jack 243, which connects to another jack 244 via feedthrough line 346. Jack 244 couples to telephone-line plug 361 as described for FIG. 3A. That is, modem 230 has been moved from the physical location of the computer 100 to a location near a fixed-position connection to telephone system 360, without duplicating any significant amount of function in another module.

Figure 4A:
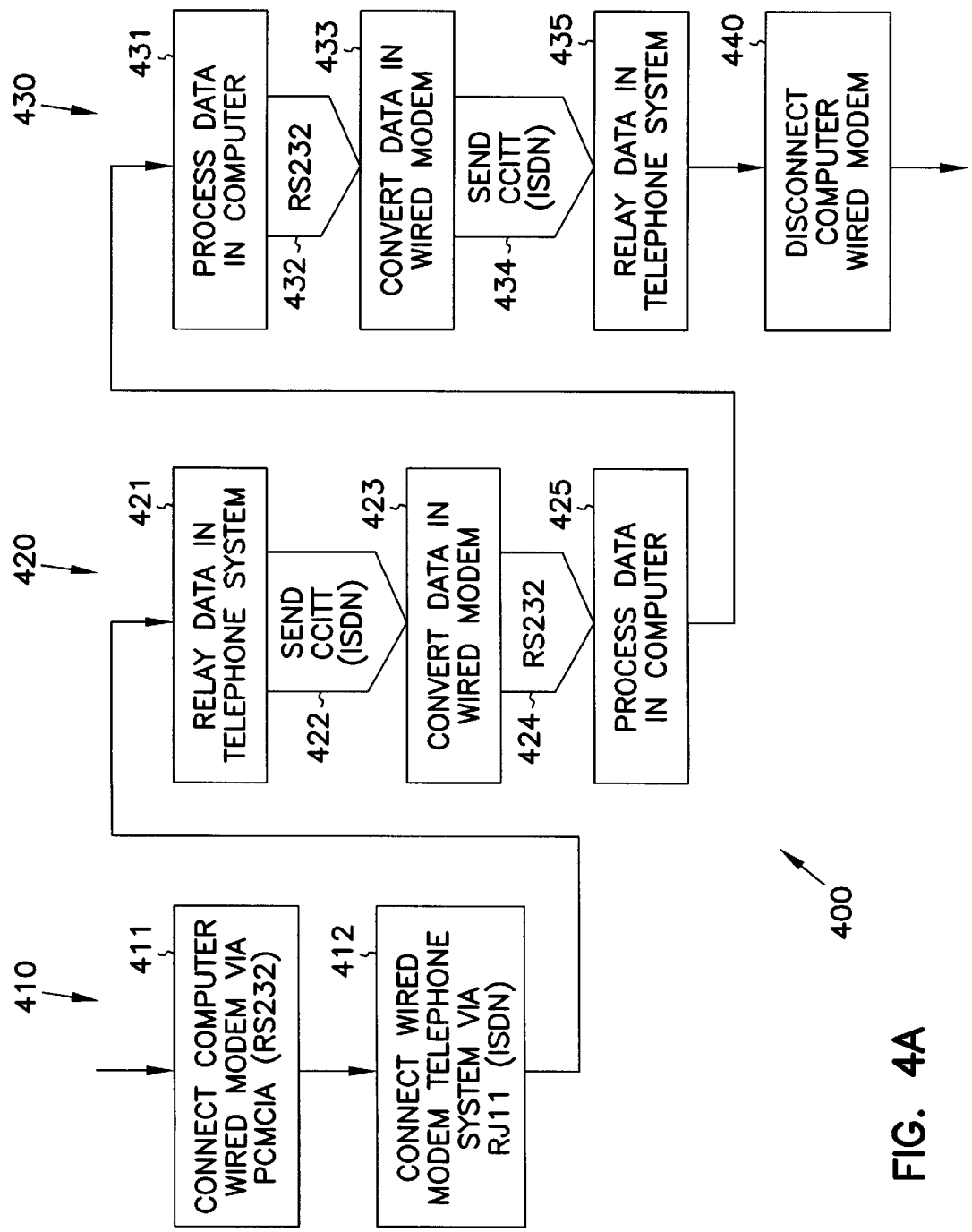
FIGS. 4A and 4B, illustrates a method of practicing the invention.

FIG. 4 is a flowchart 400 of a method for employing the same modem in both a wired and a wireless configuration inexpensively, without duplicating any significant function. Blocks 410 in FIG. 4A concern the connections for establishing the wired configuration of FIG. 3A. Block 411 couples computer 100 to wired modem 220 via the PCMCIA or other interface connectors 154 and 222, for data and power. Block 412 couples modem 220 to telephone system 360 via wired connection 224–226.

Blocks 420 communicate incoming data from the telephone system to the computer. Block 421 relays data in a CCITT, ISDN or other transport format, and block 422 transmits that data to wired modem 220, which converts it to RS232 or other baseband format in block 423. Block 424 sends this data to computer 100, which processes it in any conventional fashion in block 425. Blocks 430 communicate outgoing data in the other direction. Block 431 provides processed data. Block 432 sends this baseband data to modem 220, which converts it to modulated CCITT form, ISDN, or some other format for transport over system 360. Block 434 transmits this data over wired connection 224–226, and block 435 relays it in system 360.

Block 440 disconnects modem 220 from computer 100 in order to reuse the same modem in the wireless configuration of FIG. 3B. Although not strictly necessary, step 440 may also undo the modem-to-computer connection made in block 412.

Figure 4B:
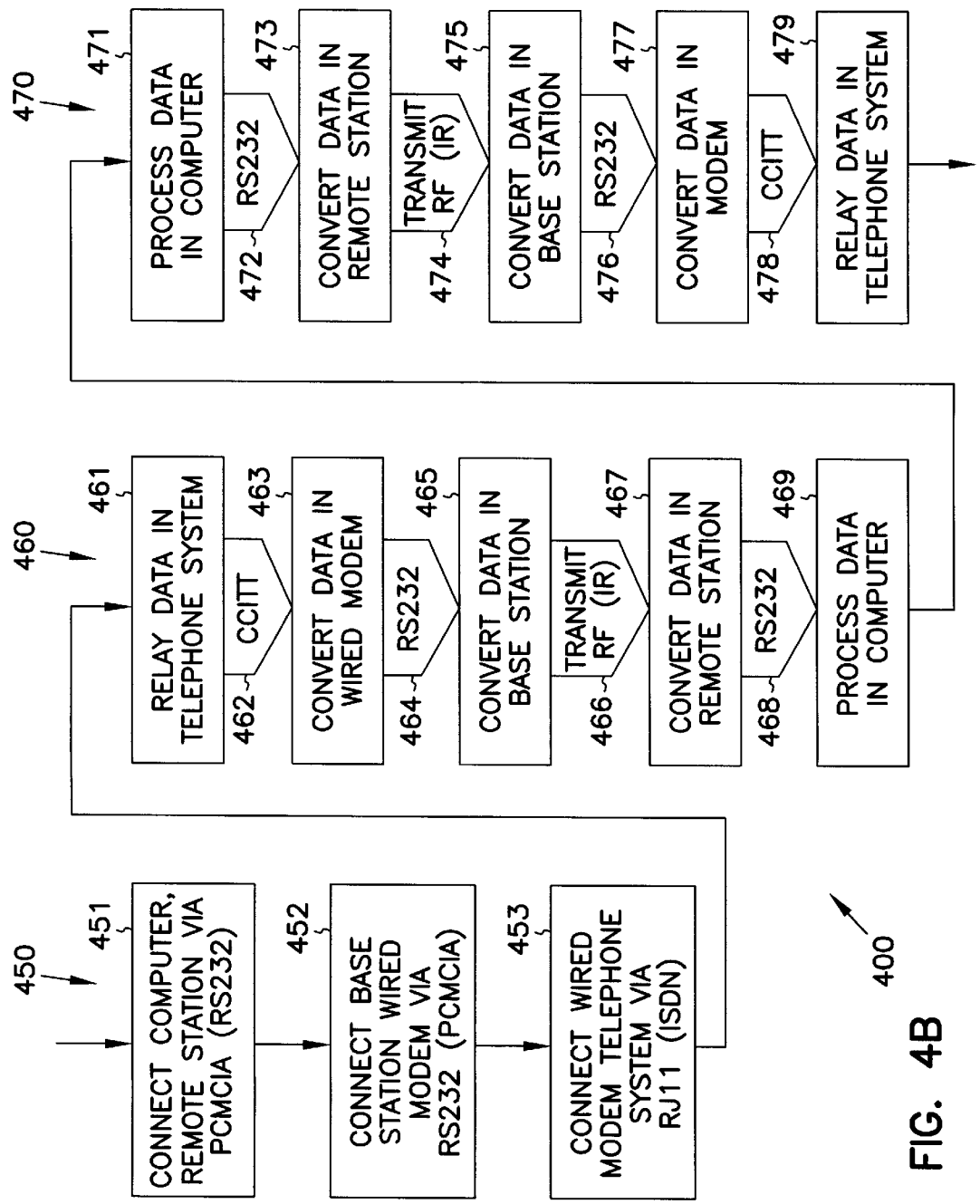

Blocks 450 in FIG. 4B describe the connections to be established in setting up the wireless configuration. Block 451 connects computer 100 to remote station 230, using the same interface connector 154 vacated by the modem in block 440. Block 452 couples the wired modem 220 to base station 240 for baseband data and power. Block 453 reconnects the modem to system 360, if step 440 had broken that connection.

The overall function of blocks 460 is to communicate data in the format of system 360 to data in the format of computer 100, using the wireless link established in blocks 450. Block 451 relays CCITT or similar system data to fixed-position connector 361. Block 462 sends this data to modem 220, which converts it to RS232 or other baseband format in block 463. Block 464 sends the baseband data directly through mated connectors 227 and 343, so that base station 240 can convert it to wireless (RF, IR, etc.) format in block 465. Block 466 transmits this data over a short-distance wireless link to remote station 230, where block 467 reconverts it to baseband. Block 468 then sends the baseband data via direct connection to computer 100 for processing in step 469.

Blocks 470 transmit outgoing data from the computer to the telephone or other communications system. Computer baseband data processed in block 471 is sent by block 472 via directly coupled connectors of a standard interface to block 473, where remote station 230 converts it to a wireless data format. Block 474 transmits this FM, IR, or other wireless data to base station 240, where block 475 converts it back to baseband data such as RS232 format. Block 476 transfers this data directly to wired modem 220 for conversion to a CCITT or other system format in block 477. Block 478 couples this data by wired connection to system 360.

Block 479 may loop back to blocks 410 if and when it is desired to return to a totally wired configuration using the same modem 220. The order of steps in method 400 does not imply any temporal sequence, except as may be inherently required by the steps themselves; for example, connection steps 410 must obviously precede the steps 420 and 430 that employ those connections.

A number of modifications within the scope of the invention will occur to those skilled in the art. Some of these have been mentioned in passing: alternative data formats for the general types called baseband, wireless, and system or transport data; alternative connector styles for interfacing to the different computers, modems, and systems; and other alternatives. One modification in particular is significant. The invention is attractive for some computer networks employing a wired local-area networks (LANs) connected to fixed-position receptacles. Although wireless LANs do exist, the wired types remain less expensive, especially where few of the network users require mobility, or where mobility is restricted to relatively short distances such as within a single room or an area of a factory or a residence. Implementing the invention for use with a wired LAN is straightforward. For example, a conventional wired LAN adapter card connected to PCI connector 121, ISA connector 131, or PCMCIA slot 154, FIG. 1, is equivalent to modem 220 in FIG. 2. Instead of producing a modulated CCITT or ISDN data format, however, a LAN adapter card converts data from baseband to a standard LAN format such as ethernet or token-ring, and uses BNC coaxial, RJ45, and other forms of standard connectors for the LAN data in place of the RJ11 and similar connectors commonly used for telephone system-data This configuration would thus allow the same LAN adapter card to function in either a wired or a wireless configuration, and would allow upgrading the LAN card without replacing an entire wireless system.

Having described preferred and alternative embodiments thereof, I claim as my invention:

1. A modular system for communicating data to and from a fixed-position telephone-line connector of a telephone system, comprising:
    a computer for processing baseband digital data, including;
        a computer interface connector for transmitting and receiving said interface data;
    a wired modem packaged as a unitary physical module, including;
        a modem interface connector adapted to mate with said computer interface connector,
        a modem telephone-line connector,
        modem electronics circuits for converting baseband data at said modem interface connector to and from modulated data at said modem telephone-line connector,
    a remote station packaged as a unitary physical module separately from said modem, including;
        a remote-station interface connector mating with said computer interface connector,
        a remote-station antenna for radiating and receiving wireless data, a remote-station transceiver for converting baseband data at said remote-station interface connector to and from wireless data at said remote-station antenna;

a base station packaged as a unitary physical module separately from said modem, including;

a base-station interface connector adapted to mate with said modem interface connector, a base-station antenna for radiating and receiving wireless data to and from said base station, a base-station transceiver for converting baseband data at said base-station interface connector to and from wireless data at said base-station antenna;

a wire coupling said modem telephone-line connector to said telephone-line connector of said telephone system, whereby data may be communicated to and from said fixed-position telephone line via either wired or wireless connection with said computer, using the same modem module in both cases.

2. A system according to claim 1 wherein said wired modem is packaged as a unitary physical module.

3. A system according to claim 2 wherein said wired modem includes a further data interface connector on said package.

4. A system according to claim 2 wherein said wired modem includes a modem power connector on said package separate from said modem interface connector for receiving power from an external source other than said computer.

5. A system according to claim 1 wherein said wired modem further includes a controller coupled to said modem electronics circuits for controlling the flow of data within said modem.

6. A wireless adapter for a data-processing system having a computer including a computer interface connector for accepting a modem interface connector of a wired modem, the modem having a modem telephone-line connector for accepting a wire to a telephone-system connector, said adapter comprising:

a remote station for converting baseband data to and from wireless data, including a remote-station interface connector mating with said computer interface connector for transferring baseband data to and from the computer, and a remote-station antenna for radiating and receiving converted wireless data; and a base station for converting baseband data to and from wireless data, including a base-station interface connector adapted to mate with said modem interface connector for transferring baseband data to and from the modem, and a base-station antenna for radiating and receiving converted wireless data to and from said remote station.

7. An adapter according to claim 6 wherein said remote station is packaged as a unitary physical module.

8. An adapter according to claim 6 wherein said base station further includes a controller coupled between said base station interface connector and said base station transceiver.

9. An adapter according to claim 6 wherein said base station further includes a base station power input connector for receiving power from an external power source.

10. An adapter according to claim 9 wherein said base station further includes a base station power output connector for supplying power to said modem.

11. An adapter according to claim 6 wherein said modem includes a further modem interface connector for baseband data, said further modem interface connector being couplable to said computer for employing said modem directly in said computer.

12. A method for adapting to wireless operation a data-processing system having a computer normally directly coupled to a wired modem coupled by a wire to a telephone-system connector, said method comprising:

coupling a remote station directly to said computer;

coupling a base station directly to said wired modem;

coupling said wired modem to said telephone system by a physical connection;

converting modulated data from said telephone system to baseband data in said modem;

converting said baseband data from said modem to wireless data in said base station;

transmitting said wireless data from said base station to said remote station;

converting said wireless data from said base station to baseband data in said remote station; and transmitting said baseband data from said remote unit to said computer.

13. A method according to claim 12 further comprising:

converting baseband data from said computer to wireless data in said remote station;

transmitting said wireless data from said remote station to said base station;

converting said wireless data from said remote station to baseband data in said base unit;

converting baseband data from said base station to modulated data in said modem; and transmitting said modulated data from said modem to said telephone system.

14. A method according to claim 12 wherein said modem is coupled to said telephone system by a wire.

15. A method according to claim 12 wherein said wire is located at least partially inside said base station.

16. A method according to claim 12 wherein said baseband data from said modem is converted directly to wireless data in said base station.

17. A method according to claim 12 wherein said wireless data from said base station is converted directly to said baseband data in said remote station.

18. A method according to claim 12 wherein said wireless data is radio-frequency data.

19. A method according to claim 12 wherein said wireless data is infrared data.

* * * * *